Oct. 18, 1932.    C. A. BORNMANN    1,883,512
CAMERA FRONT
Filed Jan. 4, 1932

INVENTOR.
CARL A. BORNMANN.
BY *Philip S. Hopkins*
ATTORNEY.

Patented Oct. 18, 1932

1,883,512

UNITED STATES PATENT OFFICE

CARL A. BORNMANN, OF BINGHAMTON, NEW YORK, ASSIGNOR TO AGFA ANSCO CORPORATION, OF BINGHAMTON, NEW YORK, A CORPORATION OF NEW YORK

CAMERA FRONT

Application filed January 4, 1932. Serial No. 584,728.

My invention relates to new and useful improvements in a camera front and has for its primary object the provision of a one piece front for photographic cameras such as are used for supporting the lens view finder, the front end of the bellows and for sliding connection with the bed or platform of the camera whereby the front and the parts supported thereby may be moved into or out of the camera casing.

Another object of my invention is to provide a camera front of the character described which is stamped and formed from a single piece of material and which provides a finder support, a lens opening, a finger piece, and means for sliding engagement with the camera platform.

Other objects and advantages in details of construction will be apparent as the description proceeds, reference now being had to the figures of the accompanying drawing forming a part of this application, wherein like reference numerals indicate like parts.

Figure 1:
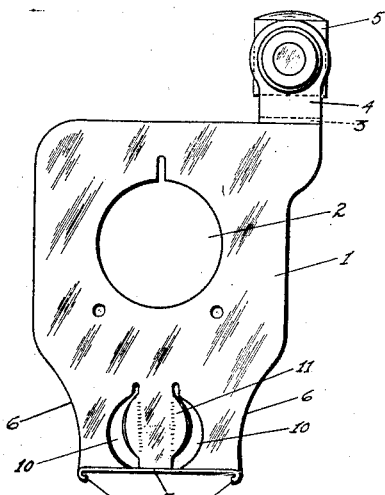
Figure 1 is a front view of my improved camera front.
Figure 2:
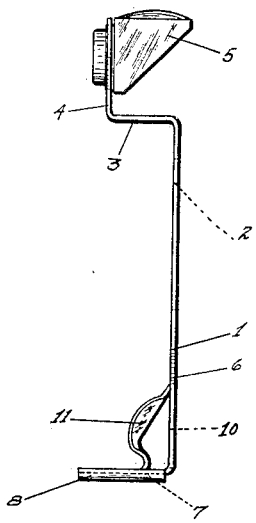
Figure 2 is a side view thereof.

The reference number 1 indicates generally the camera front of desired design or configuration and which is preferably stamped from a single flat piece of suitable metal stock.

The front is provided with an opening 2 to receive the usual camera lens mount and to which the usual bellows of the camera may be attached.

The upper edge of the front 1 is provided with a forward offset or bend 3 adjacent one side thereof, which offset is again turned upwardly as at 4 to provide a mount or support for the finder 5.

The lower end of the front 1 is reduced in size as at 6 and the extreme lower edge is bent forwardly as at 7. The side edges of the forwardly bent portion 7 are turned under as at 8 to provide parallel guide members for cooperating with the usual trackway on a camera bed or platform, whereby the front may be moved on such bed by sliding on the trackway.

Adjacent the lower end of the front 1, and substantially centrally thereof, the body portion 1 and the forwardly bent bottom portion 7, are cut away as at 10 to provide the forwardly bent finger piece 11, by means of which the front may be readily grasped by the fingers of the operator for sliding movement of the front.

The parts of a camera with which my improved front cooperates, have not been shown, inasmuch as they are conventional and form no part of this invention.

Of course, changes may be made in details of construction without departing from the spirit and scope of my invention. I do not limit myself, therefore, to the exact form herein shown and described other than by the appended claims.

I claim:

1. A camera front comprising a one piece stamping having a bent portion provided with integral channel guiding means thereon.

2. A camera front comprising a one piece stamping having a bent portion provided with integral channel guiding means thereon, and a finger piece formed in said piece for moving the same.

3. A camera front comprising a one piece stamping having a bent portion provided with integral formed channel guides, a formed integral finger piece, a formed integral finder support and a lens support opening.

In testimony whereof, I affix my signature.

CARL A. BORNMANN.